United States Patent Office 3,671,357
Patented June 20, 1972

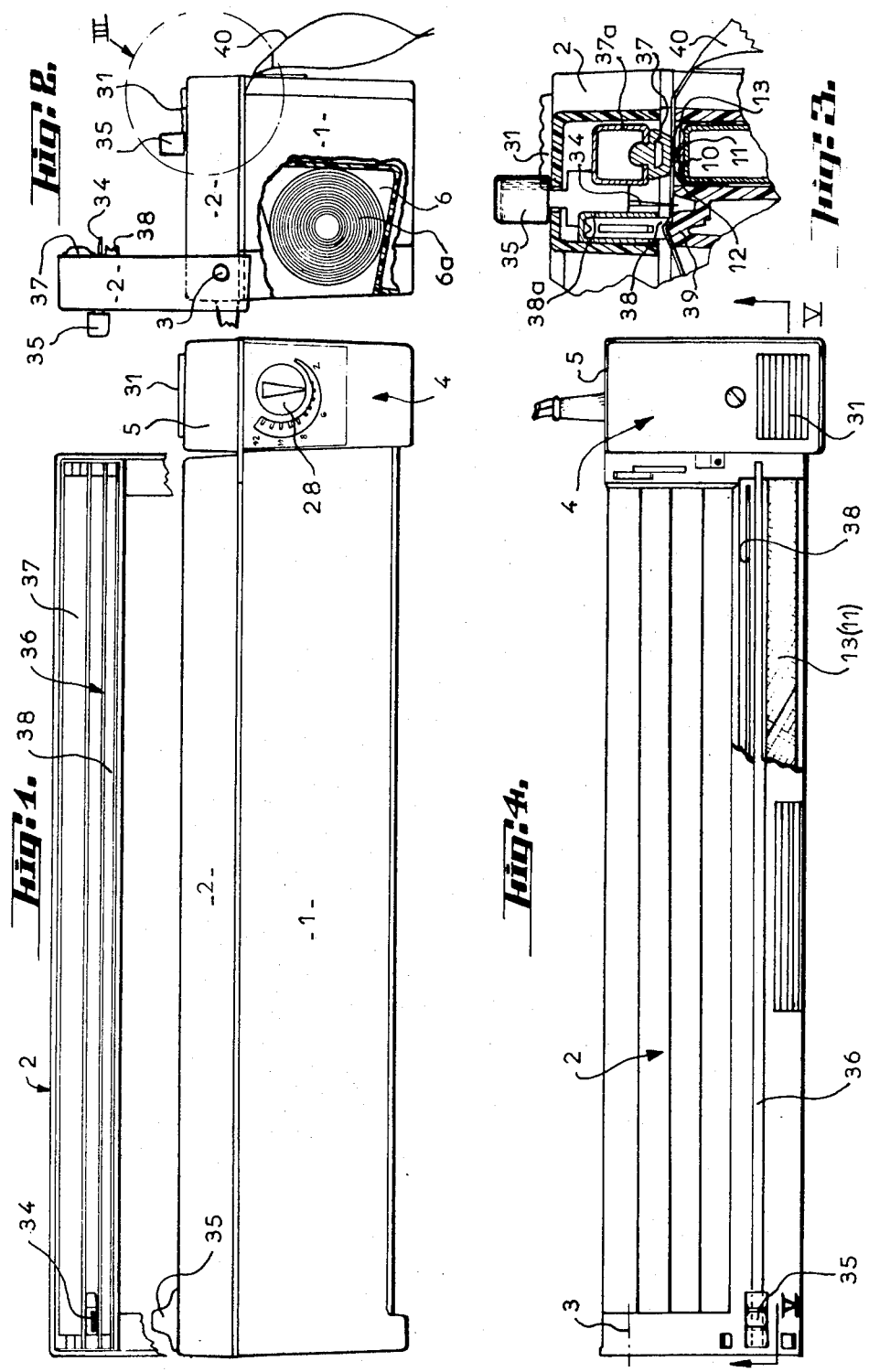

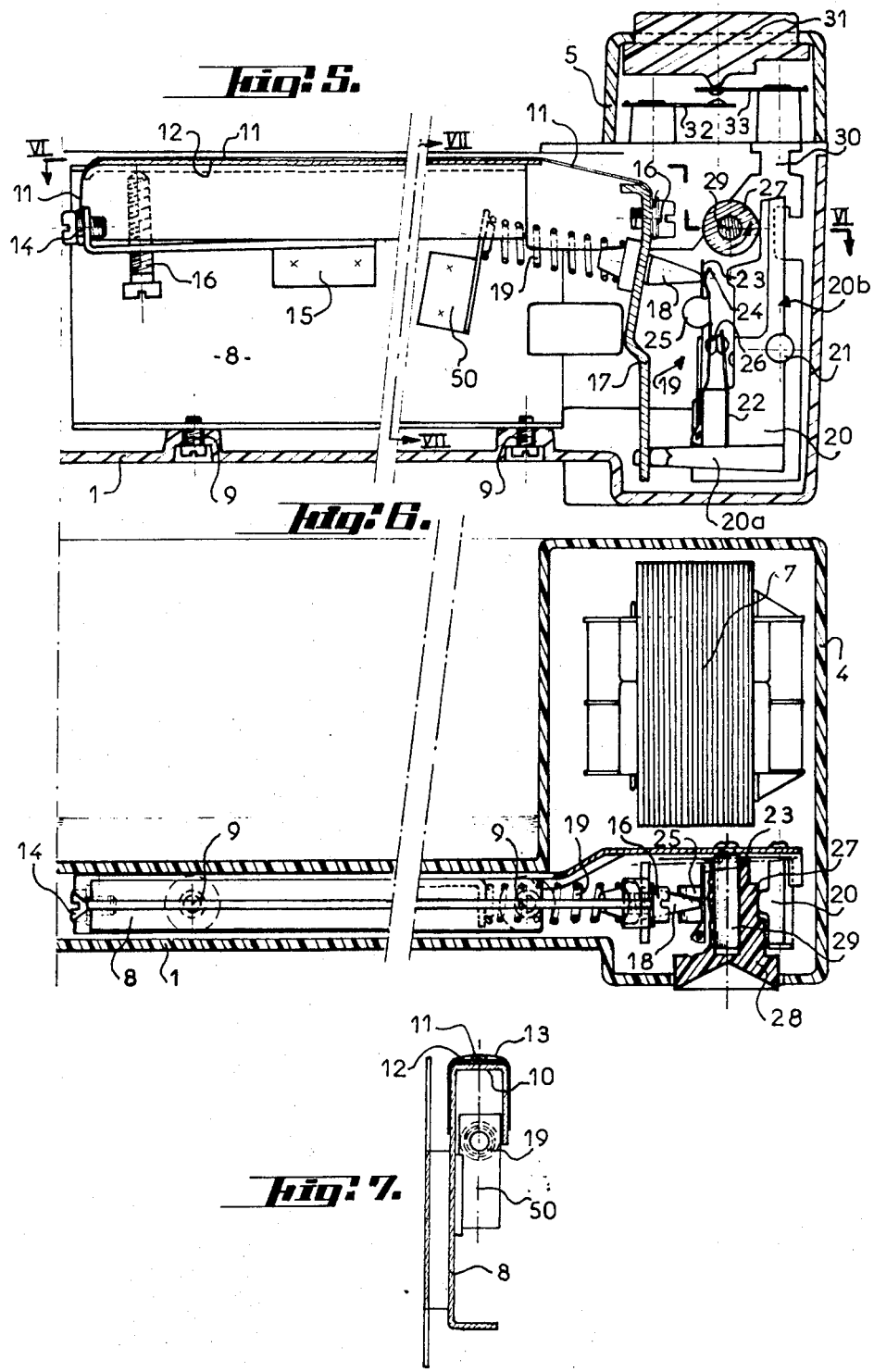

3,671,357
APPARATUS FOR WELDING THIN-SHEET PLASTICS MATERIALS
Maurice Marie Achille Trouilhet, Lyon, France, assignor to Calor, Lyon, France
Filed Mar. 4, 1971, Ser. No. 120,992
Claims priority, application France, Apr. 10, 1970, 7013108
Int. Cl. B30b 15/34; B32b 31/00
U.S. Cl. 156—359          10 Claims

ABSTRACT OF THE DISCLOSURE

The invention essentially relates to an apparatus for welding thin-sheet plastics materials including support means secured to a casing and one heating tape stretched upon said support means, said tape having one end connected to a movable element so as to cause the displacement of said movable element during the lengthening of the tape; thermostatic switch means carried by a member pivotably mounted in said casing; means for actuating the said pivotable member; and a cover hingedly mounted on said casing and provided with means for pressing the said sheets and for cutting them outside the weld line thus formed.

---

The present invention has for its object a small electrical apparatus for welding very rapidly thin-sheet plastics materials.

More specifically, the apparatus according to the invention enables hermetically closed bags to be made quite conveniently from plastics materials by effecting successively weld seams and cuttings in a tape of plastics material having the shape of a sheath.

There are already known industrial apparatus for welding thermoplastic material films. The operation of such apparatus was based on high-frequency heating of the material to be welded or heating of the said material by means of a heating resistor element supplied with a deferred current impulse.

The said known apparatus often comprised a certain number of auxiliary members for controlling the temperature at every moment and often could be used only by professionals.

The present invention concerns a small apparatus for welding plastics materials, which is inexpensive, of particularly simple design and the use of which is within the capacity of everybody.

The apparatus for welding thin-sheet plastics materials according to the invention is of the type comprising a heating element on which the said sheets are applied in order to be hot pressed and welded, and is characterized in that it comprises in combination:

At least one heating tape stretched on a support secured to the base of the casing of the apparatus, one of the ends of the said tape being solid with the said support, whereas the other end of the tape is connected to a movable element which is so urged by return means as to cause a displacement of the movable element during the lengthening of the tape through expansion, A thermostatic switch actuated by the said movable element and carried by a member mounted pivotably in the said casing, Means for actuating the said pivotable member in order that it may co-operate with the movable element so as to adjust the heating temperature of the tape, and A cover hingedly mounted on the casing and provided with means for hot pressing the said sheets and cutting them outside the weld seam thus formed.

It is thus understood that the duration of heating of the tape is limited automatically by a thermostatic switch under the action of the lengthening through expansion of the said tape between its stationary support serving as a reference member and the said movable element.

Moreover, since the welding device is associated with a cutting device, the plastics material sheath can be cut quite readily to the desired length in order to form pockets or bags having the desired dimensions.

According to another feature of the invention, the heating tape is advantageously interposed between two projecting bands made from heat-insulating materials, whereas the tape support is substantially in the shape of a ⊂ in cross-section, the said tape resting on the upper horizontal portion of the said support.

According to still another feature of the invention, one end of the tape is secured to one end of the support by means of an angle-member which is itself solid with the said support and carries a screw for adjusting the stretch of the tape by bearing upon the underside of the said support.

According to another feature of the invention, the movable element to which the other end of the tape is secured is a metal plate provided with an insulating stud projecting on either side of the said plate in order to receive, on one side, a spring bearing upon an angle-member solid with the support, and to actuate the thermostatic switch by its other side.

According to another feature of the invention, the said thermostatic switch is a contact-carrying reed switch of the quick-break type.

The invention will be better understood and other objects, characteristics and advantages thereof will appear as the following description proceeds, with reference to the appended drawings given solely by way of example illustrating one form of embodiment of the invention and wherein:

FIG. 1 is an elevational and front view of the apparatus, wherein the cover is also shown in the higher and raised position for the sake of clarity;

FIG. 2 is a side view, partially broken away, wherein the cover is shown in the closed and also in the open position;

FIG. 3 is an enlarged view, partially broken away, of the encircled portion II of FIG. 2;

FIG. 4 is a top view of the apparatus with parts broken away;

FIG. 5 is a sectional view upon the line V—V of FIG. 4;

FIG. 6 is a sectional view upon the line VI—VI of FIG. 5, and

FIG. 7 is a sectional view upon the line VII—VII of FIG. 5, showing the support of the heating tape, excluding the body of the apparatus.

According to one form of embodiment and with reference to FIGS. 1, 2 and 4, an apparatus for welding thin-sheet plastics materials according to the invention comprises essentially:

A casing 1 made for instance from a suitable thermoplastic material and containing the active assembly of the apparatus, A cover 2 hingedly mounted at 3 on the casing 1 provided with means for pressing and cutting the sheets in the hot state as will be described subsequently, A portion 4 located outside the active assembly of the casing 1, the said portion 4 comprising a cover 5 and containing a supply transformer 7 (FIG. 7) and a thermostatic switch 19 (FIG. 5).

A compartment 6 provided in the casing 1 (FIG. 2) and adapted to receive a wound sheet 6a of plastics material.

Referring more particularly to FIGS. 5 and 7, it is seen that the active assembly contained in the casing 1 comprises a support 8 screwed at 9 on the casing base. The support 8 is substantially in the shape of a ⌐ in cross-section and is preferably made from a folded mild steel sheet. The upper portion of the support 8 includes a flat portion 10 on which rests a tape 11 forming a heating resistor and inserted between the protective band 12 made from a heat-insulating material, such as "samicanit," and a flexible protective covering band 13, such as for instance Teflon textile glass, i.e. a heat resisting substance having antiadherent properties. Lastly the heating tape 11 and the protective bands 12 and 13 are held applied on the flat portion 10 of the support 8 by means of, for instance, an adhesive tape. It is thus understood that the thermoplastic material to be welded cannot adhere to the heating tape 11.

As appears from FIG. 5, one end of the tape 11 is secured at 14 on an angle-member 15 welded on the support 8. The angle-member 15 carries a screw 16 which, by bearing upon the inner face of the flat portion 10 of the support 8, enables the position of the said angle-member to be adjusted with respect to the said support 8 while at the same time ensuring a suitable stretch of the tape 11.

The other end of the tape 11 is screwed at 16 on a metal plate 17 forming a lever. The said metal plate is provided with an insulating member 18 projecting on either side of the plate. Indeed, a spring 19 mounted between an angle-member 50 welded to the support 8 and the portion of the insulating member 18 projecting from the left side of the plate 17, constantly urges the said plate to the right (FIG. 5), whereas the portion of the insulating member 18 located at the right of the plate 17 is adapted to actuate the thermostatic switch 19.

An L-shaped member 20 is pivotably mounted in the casing 1 on a pin 21. The member 20 is preferably made from an insulating plastics material of the polyamide type and supports the thermostatic switch assembly 19.

The said switch is advantageously of the quick-brake type; it comprises a stationary contact 22 and a movable blade 23 which is held applied on the insulating member 18 by the resilient blade 24. The movable blade 23 acts, through the medium of a rolling-type spring 25, upon the movable contact 26 which is thus applied or not applied on the stationary contact 22 depending on the position of the upper end of the movable blade 23.

The pivotable member 20 supporting the switch 19 comprises a substantially horizontal lower arm 20a which co-operates with the end of the plate 17 and a substantially vertical arm 20b, the upper portion of which is adapted to co-operate with a cam 27. Otherwise stated, the pivotable member 20 is held applied on the pin 21 by means of the plate 17 which, by bearing upon the lower arm 28 of the member 20, causes the latter to so rotate as to apply the vertical arm 20b on the cam 27.

As appears more clearly from FIGS. 1 and 6, the cam 27 may be actuated from outside the casing 1 by means of a control button 28 carrying the said cam and rotating about a pin 29.

The heating tape 11 is connected to the secondary winding of the transformer 7 by means of a terminal 30 (FIG. 5) solid with the support 8, the said support being electrically connected to the end 14 of the tape 11, and, by means of a conductor (not shown), welded to the plate 17, the latter being electrically connected to the other end 16 of the tape 11. Of course, the switch constituted by the stationary and movable contacts 22 and 26 is connected in series with the primary winding of the transformer 7 which is thus supplied or not supplied depending on the position of the resilient blade 24 with respect to the movable contact 26.

At 31 there is shown a push-button for heating the tape 11, the said push-bhtton projecting on the cover 5 of the outer portion 4 of the casing 1 proper. The said push-button is adapted to close or open the heating circuit by bringing into contact or out of contact the blades 32 and 33 which are secured in a suitable manner on the insulating support.

Referring now to FIGS. 1, 2 and 3, it is seen that the cover 2 adapted to be moved down onto the heating tape to effect the welding comprises:

A cutter 34 solid with an actuating knob 35 and sliding in a slot 36 provided on the whole length of the cover 2, A pressing member 37 made for instance from a silicone-type elastomer which is anti-adherent with respect to the sheets to be welded and capable of withstanding high temperatures, and An element 38 projecting from the cover and adapted to nip the sheath 40 on a corresponding portion of the casing 1 so as to hold the said sheath and facilitate the cutting thereof.

As appears more clearly from FIG. 3, the pressing and flexible member 37 is suitably mounted in a frame 37a solid with the cover 2, whereas the element 38 adapted to nip the sheath 40 on a corresponding raised portion 39 of the casing 1, is mounted in a suitably shaped member 38a which is also solid with the cover 2.

It should be noted that when the cover 2 is moved down and pressed onto the casing 1, the cutter 34 projects from the longitudinal slot 36 in which it is adapted to slide. Lastly, the actuating knob 35 of the cutter 34 is so designed as to be inserted directly into a corresponding slit of the cover 2 owing to the resiliency of the latter.

The frames 37a and 38a located on either side of the cutter 34 are held in the cover 2 by means of two flanges or side plates constituted by moulded members clinging to corresponding bosses (not shown) of the cover 2.

Lastly, the control button 28 of the cam 27 described previously, moves in front of a graduation enabling the time of heating of the tape to be adjusted in accordance with the thickness of the sheets to be welded or the type of welding to be carried out. The operation of the welding apparatus according to the invention is readily inferred from the description just made.

The plastics material sheath 6a located in the compartment 6 of the casing 1 may be readily unrolled so as to be made to pass above the welding and cutting region of the casing 1 of the apparatus. When the end of the sheath is thus made to extend beyond the front of the apparatus and the desired length corresponding to the bag to be manufactured is obtained, the cover 2 is moved down and thus nips the said sheath by means of the pressing members 37 and 38 (FIG. 3) while at the same time pressing it on the heating tape 11. The cutting of the sheath is then performed by means of the cutter 34, and then the push-button 31 is actuated to effect the heating of the tape 11. The welding of the sheath is effected, while the tape 11 lengthens through expansion until the plate 17 (FIG. 5) causes the resilient blade 24 of the thermostatic switch 19 to swing to open the contact 22–26 of the said switch and stop the supply of electric current in order that the film may cool. The pressure on the button 31 is then relaxed and the cover is opened to remove the welded bag. Of course, a similar operation is carried to weld the other side of the bag after the foodstuff which it is desired to pack is introduced therein.

The operator may actuate the button 28 in order to modify, through the medium of the cam 27, the position of the pivoting member 20 and, therefore, the position of the metal plate 17 so as to adjust the swing point of the thermostatic switch 19. Otherwise stated, the operator, by acting upon the button 28, may adjust at will the lengthening of the tape 11 required to attain the point of breaking of the current. Selecting the lengthening of the tape is therefore tantamount to selecting the temperature of the tape and, therefore, the temperature to be reached by the thermoplastic film to be welded, independently of the pressure exerted on the cover during the welding operation. The apparatus may thus be adjusted for various thicknesses of one and the same type of sheets or for various sheet materials of one and the same thickness.

Of course, the present invention is by no means limited to the form of embodiment described and illustrated which has been given by way of example only. Thus, a great variety of materials for making the various parts of the apparatus may be used without departing from the scope of the invention. The invention therefore comprises all technical equivalents to the means described as well as their combinations should the latter be carried out according to its spirit and within the scope of the following claims.

What is claimed is:

1. Apparaatus for welding thin-sheet plastics materials, comprising a heating element on which are applied the sheets of plastics materials in order to be pressed and welded in the hot state, said apparatus including in combination: support means secured to the casing of said apparatus and at least one heating tape stretched upon said support means, one end of the said tape being solid with said support means, whereas the end of the tape is connected to a movable element so urged by return means as to cause the displacement of said movable element during the lengthening through expansion of the tape: thermostatic switch means actuated by the said movable element and carried by a member pivotably mounted in said casing: means for actuating the said pivotable member so that the latter may co-operate with the said movable element in order to adjust the temperature of heating of the tape; and a cover hingedly mounted on said casing and provided with means for pressing the said sheets in the hot state and for cutting them outside the weld line thus formed.

2. Apparatus according to claim 1, wherein the said tape is interposed between two protective bands made from heat-insulating materials, whereas said support means are substantially in the shape of a ⌷ in cross-section, the said tape resting on the upper horizontal portion thereof.

3. Apparatus according to claim 1, wherein said one end of the tape is secured to one end of the said support means by means of an angle-member which is itself solid with said support means and carries a screw for adjusting the stretch of the tape by bearing on the underside of the said support.

4. Apparatus according to claim 1, wherein said movable element to which is secured the other end of the tape is a metal plate provided with an insulating stud projecting on either side of the plate so as to receive, on one side, a spring bearing upon an angle-member solid with the said support and to actuate by its other side said thermostatic switch means.

5. Apparatus according to claim 1, wherein said switch is a blade or reed switch of the quick-break type.

6. Apparatus according to claim 1, wherein the said pivotable member is substantially L-shaped and is actuated by a cam solid with a control button located on the outside of the casing of the apparatus.

7. Apparatus according to claim 1, wherein the said cover is provided with a slot in which slides a cutter or the like adapted to protrude from the said slot when the cover is pressed on said casing.

8. Apparatus according to claim 7, wherein the said cover comprises two longitudinal pressing members on either side of the said slot in order to nip the sheets when the cover is moved down onto the casing in order, respectively, to ensure the welding of the sheets and facilitate their cutting.

9. Apparatus according to claim 1, wherein said casing includes a compartment adapted to receive a wound sheath of plastics material 10. Apparatus according to claim 1, wherein said tape can be temporarily heated by means of a push-button retained in said casing and allowing to close the electric circuit.

References Cited
UNITED STATES PATENTS

| | | | |
|---|---|---|---|
| 2,719,567 | 10/1955 | Gardner | 156—359 |
| 3,354,018 | 11/1967 | Lazear et al. | 156—515 |

DOUGLAS J. DRUMMOND, Primary Examiner

U.S. Cl. X.R.

156—510, 583